Nov. 30, 1965      J. E. BROOK      3,221,242

FREQUENCY COMPENSATED PHASE CLOCK

Filed Feb. 26, 1963      2 Sheets-Sheet 1

INVENTOR.
JAMES E. BROOK
BY Roland Plotkel

ATTORNEY

United States Patent Office 3,221,242
Patented Nov. 30, 1965

3,221,242
FREQUENCY COMPENSATED PHASE CLOCK
James E. Brook, Maywood, N.J., assignor to The Bendix Corporation, Teterboro, N.J., a corporation of Delaware
Filed Feb. 26, 1963, Ser. No. 261,096
7 Claims. (Cl. 321—57)

The invention relates generally to phase angle generators or phase clocks and particularly to frequency compensation for phase clocks.

An object of the invention is to provide a novel circuit for use in a phase clock to compensate for frequency errors in the output due to frequency variations of the source of excitation.

Another object of the invention is to provide a novel frequency compensated phase clock having a lumped, linear, finite, bilateral, passive network which compensates for frequency induced phase distortions.

Another object of the invention is to provide a novel passive network for use in a phase clock to improve the accuracy of the phase clock by at least a decade by reducing the error due to frequency variations of the source.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
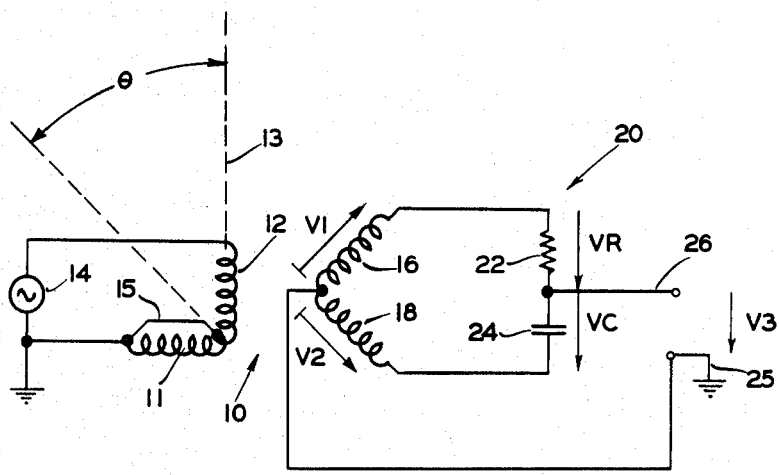
FIGURE 1 is a conventional phase clock for generating an electrical phase angle equal to a mechanical angle.

A conventional circuit for generating an electrical phase angle equal to a mechanical angle is shown in FIGURE 1 wherein a resolver 10 having a pair of rotor windings 11 and 12 adapted to be mechanically displaced by an analog input shaft 13 from a reference position by an angle $\theta$ is connected across a source of alternating voltage 14. Rotor winding 11 is short circuited by a conductor 15. A current in rotor winding 12 from source 14 induces in a pair of stator windings 16 and 18 voltages $V_1$ and $V_2$ having the same frequency as the source voltage but amplitudes which vary respectively in accordance with the sine and cosine of the angular displacement of the rotor 12.

The two amplitude varying signals $V_1$ and $V_2$ are converted to a phase displaced signal $V_3$ by a network 20 made up of a resistor 22 and a capacitor 24 connected across the stator windings 16 and 18. The voltage drops $V_R$ and $V_C$ respectively across the resistance element and capacitance element 24 are equal to (1) $$V_C = \frac{1}{\sqrt{1+w^2R^2C^2}}|V_2+V_1|$$

(2) $$V_R = \frac{WRC}{\sqrt{1+w^2R^2C^2}}|V_1+V_1|$$

The phase displaced voltage $V_3$ is measured with respect to ground potential 25 from a junction 26 of the resistor 22 with capacitor 24 and is of constant amplitude but phase displaced by an angle $\phi$ which is proportional to the mechanical displacement of rotor 12.

When the resistance of resistor 22 and the absolute value of one over the capacitance of capacitor 24 times the angular velocity $w$ of the alternating voltage from source 14 are equal, then the amplitude of the voltage drop $V_R$ is exactly equal to the amplitude of the voltage drop $V_C$ and the phase displacement $\phi$ of voltage $V_3$ is linearly related in a 1 to 1 ratio to the mechanical displacement $\theta$ of the rotor 12. The angular velocity $w$ at which this relationship exists is termed the nominal angular velocity and is designated $w_0$.

When the angular velocity $w$ varies from the nominal or predetermined center frequency angular velocity value $w_0$, the electrical phase shift $\phi$ is no longer equal to the mechanical displacement $\theta$ because $V_R$ and $V_C$ are no longer equal although they remain orthogonal. Expressing the frequency deviation from nominal in dimensionless form (3) $$u = \frac{w}{w_0}$$

where $w$ equals actual angular velocity, and $w_0$ equals the nominal angular velocity. Then Equations 1 and 2 can be rewritten as (4) $$V_C = \frac{1}{\sqrt{1+u^2R^2C^2}}|V_1+V_2|$$

(5) $$V_R = \frac{uRC}{\sqrt{1+u^2R^2C^2}}|V_1+V_2|$$

It can be shown that an error function $\Delta\phi$ is proportional to the deviation in electrical phase displacement of voltage $V_3$ from mechanical angular displacement $\theta$ of rotor 12 given by (6) $$\Delta\phi = (\sin \theta \cos \theta - \frac{1}{2})\Delta u$$

for small variations $\Delta u$ of angular velocity from nominal angular velocity $u_0$.

With this as background, a means for compensating the frequency error $\Delta\phi$ will now be described whereby the perturbing force is identified as a voltage vector which is then suppressed by application of a synthesized counter force generated by lumped, linear, finite, bilateral passive elements.

Figure 2:
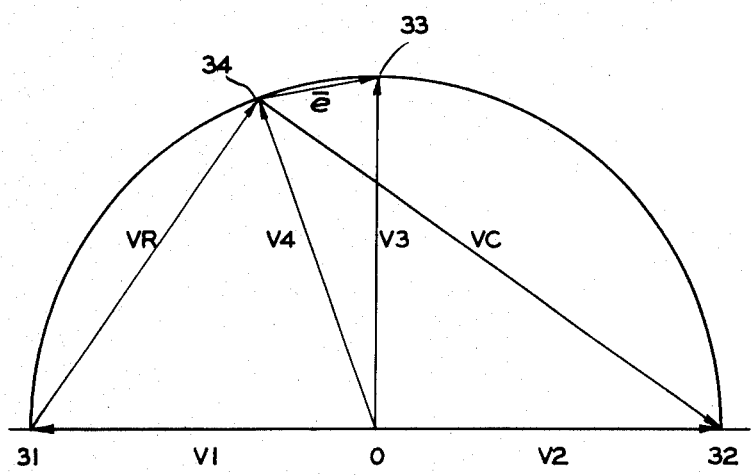
FIGURE 2 is a vector diagram showing the phase relationship of the voltages in the circuit of FIGURE 1.

The balance phase clock having equal peak amplitudes of $V_1$ and $V_2$ and resistance equal to reactance at a predetermined nominal center frequency of $f_0$ equal to 400 c.p.s. will be considered for compensation. FIGURE 2 is a vector diagram of the phase relationship of the voltages $V_1$, $V_2$, $V_R$, $V_C$ and $V_3$ of the circuit of FIGURE 1, for the rotor 12 is displaced so that $\theta$ equals $135°$, and the electrical phase displacement of the voltage $V_3$ at $\phi$ equals $+90°$.

Referring to FIGURE 2, vectors $V_1$ and $V_2$ represent the voltages from stator windings 16 and 18 acting across the sink of the resistor 22 and the storage of capacitor 24 connected in series, and represented by vectors $V_R$ and $V_C$ respectively.

Point 0 in FIGURE 2 is ground reference corresponding to ground potential 25 in FIGURE 1. A point 34 locates the junction of vectors $V_C$ and $V_R$ and corresponds to the junction of winding 16 with resistance 22 on FIGURE 1. A point 33 locates the output vector of voltage $V_3$ at the nominal angular velocity $w_0$. Point 34 also locates the phase shift of the output voltage designated here $V_4$ at any other frequency $w$. The vector $V_4$ may also be termed the perturbed vector and contains an error phase displacement caused by frequency variations of source 14 from the predetermined center frequency. A vector $\bar{e}$, to be derived, corrects or compensates the phase error in $V_4$.

It is apparent that $V_R$ and $V_C$ remain orthogonal for all frequencies and that the focus of point 33 is the circle on the diameter $V_2-V_1$. In terms of the dimensionless frequency $$u = \frac{w}{w_o}$$

$V_4$ will be symmetrically disposed about $V_3$ for all frequency pairs $u$ and $1/u$. The problem at hand is concerned with frequencies in the small range $w_o \pm 5\%$ where fractional and percent deviations are approximately equal. Within this range, it is desired to add the compensating vector $\bar{e}$ to the frequency perturbed vector $V_4$ so that the resultant will lie on the unperturbed vector $\bar{V}_3$.

The vector $\bar{e}$ is now computed in terms of its real and $j$ parts; after a coordinate transformation is made to shift the origin from point 0 to point 31. The voltage drop across R is (7) $\quad V_R = 2V_1 \frac{w^2R^2C^2 + jwRC}{1+w^2R^2C^2}$ In dimensionless frequency, 7 becomes the second order equation (8) $\quad V_R = 2V_1 \left( \frac{u^2}{1+u^2} + j\frac{u}{1+u^2} \right)$ The center frequency vector $\bar{V}_3$ locates the point 33 at $(V_1, jV_1)$. The vector $\bar{e}$ is then the difference in the coordinates of point 33 less the coordinates at point 34. This is (9) $\quad \bar{e} = V_1 \left[ \left(1 - \frac{2u^2}{1+u^2}\right) + j\left(1 - \frac{2u}{1+u^2}\right) \right]$ For $V_1$ equal to unity, the numerical values of the components of $\bar{e}$ are as tabulated.

*Table 1*

| $u$ | $u^2$ | $\frac{u^2}{1+u^2}$ | $\frac{u}{1+u^2}$ | $1-\frac{2u^2}{1+u^2}$ | $j\left(1-\frac{2u}{1+u^2}\right)$ |
|---|---|---|---|---|---|
| .950 | .9025 | .4743 | .4993 | +.0514 V | +.0014 V |
| .975 | .9506 | .4873 | .4995 | +.0254 | +.0005 |
| 1.000 | 1.0000 | .5000 | .5000 | .0000 | .0000 |
| 1.025 | 1.050 | .5122 | .4995 | -.0244 | +.0005 |
| 1.050 | 1.1025 | .5244 | .4993 | -.0488 | +.0014 |

The problem now is to find a null network that will produce carrier in-phase signal proportional to deviation from center frequency. No such network exists, but the desired performance may be closely approximated with a frequency compensating network shown in FIGURE 3.

Figure 3:
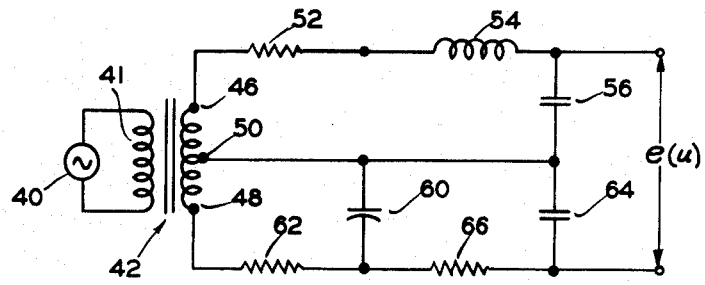
FIGURE 3 is a schematic diagram of a null network for producing a carrier in-phase signal proportional to deviation from center frequency.

Referring to FIGURE 3, there is shown a source of excitation 40 having a nominal center frequency of 400 c.p.s. applied to a primary winding 41 of transformer 42. A secondary winding 44 of transformer 42 has two terminals 46 and 48 and a tap 50. The network has three meshes. Connected between terminal 46 and tap 50 is a series connection of a resistor 52, an inductor 54, and a capacitor 56. Connected between center tap 50 and terminal 48 is a series connection of a capacitor 60 and a resistor 62. Another capacitor 64 and resistor 66 is connected across the capacitor 60. An output signal $e(u)$ is taken across capacitors 56 and 64.

Typical values of the elements in the null network of FIGURE 3 are as follows. Capacitor 56 .02 microfarad; capacitors 60 and 64 each .01 microfarad; resistors 62 and 66 each 39.8 kilo-ohms. The value of resistor 52 is selected to provide a zeta (defined below), equal to .5; and the amplitude of the voltage between tap 50 and terminal 48 is equal to three times the amplitude of the voltage between terminal 46 and tap 50. The inductance of the inductor 54 is 1.6 henrys.

The network consists of two second order systems characterized by the general function form $$A_2u^2 + A_1j + A_0$$

wherein the damping ratio, zeta, is defined as $$\zeta = A_1/2(A_0A_2)^{1/2}$$

The signal $e(u)$ is a summation of the voltage drops across capacitors 56 and 64 as shown in FIGURE 3.

Operation depends upon the fact that the two damping ratios are slightly different and that relative excitations are set at exactly the ratio of the zetas.

(10) $\quad e(u) = v\left\{ \frac{(1-u^2) - ju}{(1-u^2)^2 + u^2} - 3\frac{(1-u^2) - j3u}{(1-u^2)^2 + 9u^2} \right\}$ where $u$ is defined $w_o/w$ for $w_o = 2\pi(400)$.

It should be noticed that the transfer function of the network may be defined as

(11) $\quad \frac{e(u)}{v} = \frac{(1-u^2) - ju}{(1-u^2)^2 + u^2} - 3\frac{(1-u^2) - j3u}{(1-u^2)^2 + 9u^2}$ A methodical solution is undertaken in the vicinity of $u=1$ by first tabulating the various functions of $u$ in Equation 10.

*Table 2*

| $u$ | $u^2$ | $(1-u^2)$ | $(1-u^2)^2+u^2$ | $(1-u^2)^2+u^2$ | $(1-u^2)^2+9u^2$ |
|---|---|---|---|---|---|
| .950 | .9025 | +.0975 | .0095 | .9120 | 8.1320 |
| .975 | .9506 | +.0494 | .0024 | .9530 | 8.5578 |
| 1.000 | 1.0000 | .0000 | .0000 | 1.0000 | 9.0000 |
| 1.025 | 1.0506 | -.0506 | .0025 | 1.0531 | 9.4579 |
| 1.050 | 1.1025 | -.1025 | .0104 | 1.1129 | 9.9329 |

The real parts and net values of $e(u)$ are

*Table 3*

| $f$ | $u$ | $\frac{u}{(1-u^2)^2+u^2}$ | $-\frac{3(1-u^2)}{(1-u^2)^2+9u^2}$ | Real $e(u)$ |
|---|---|---|---|---|
| 380 | .950 | +.1069 | .0357 | +.0712 |
| 390 | .975 | +.0518 | .0173 | +.0345 |
| 400 | 1.000 | .0000 | .0000 | .0000 |
| 410 | 1.025 | -.0480 | .0160 | -.0320 |
| 420 | 1.050 | -.0921 | .0309 | -.0612 |

The $j$ parts and net values are

*Table 4*

| $j$ | $u$ | $-\frac{u}{(1-u^2)^2+u^2}$ | $\frac{9u}{(1-u^2)^2+9u^2}$ | $je(u)$ |
|---|---|---|---|---|
| 380 | .950 | -1.0416 | +1.0514 | +.0098 |
| 390 | .975 | -1.0231 | +1.0253 | +.0022 |
| 400 | 1.000 | .0000 | .0000 | .0000 |
| 410 | 1.025 | -.9734 | +.9753 | +.0019 |
| 420 | 1.050 | -.9434 | +.9514 | +.0080 |

It remains to connect the network of FIGURE 3 to the phase clock of FIGURE 1 and to scale the amplitude of $e(u)$ for minimum phase angle error in the frequency range $u=.95$ to $u=1.05$. The circuit of the frequency compensated phase clock is given in FIGURE 4 where it is seen that the compensating network is floated via the excitation transformer and the compensating voltage $e(u)$ is simply added to the phase clock voltage $e(\phi)$.

Figure 4:
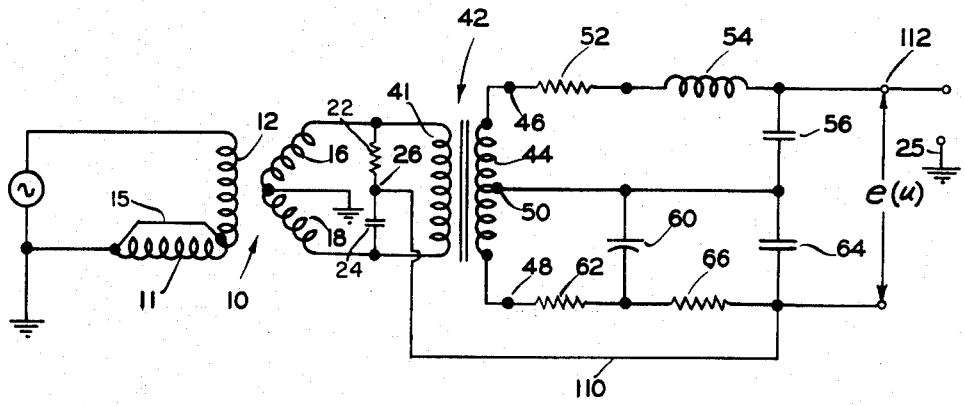
FIGURE 4 is a novel frequency compensated phase clock constructed in accordance with the invention.

Referring to the drawing of FIGURE 4, there is shown a phase clock of FIGURE 1 and the compensating network of FIGURE 3. Like elements in both figures bear like legend. Transformer 42 has its primary 41 connected across the stator windings 16 and 18. A secondary winding 44 has two terminals 46 and 48 and a tap 50. Connected between terminal 46 and tap 50 there is a resistor 52, an inductor 54, and a capacitor 56. Connected between tap 50 and terminal 48 there is a capacitor 60 and resistor 62. A capacitor 64 and resistor 66 are connected in parallel with capacitor 60.

The transformer 42 has the following typical turns ratio. On primary, four N turns; on secondary between center tap 50 and terminal 46, three N turns; and between center tap 50 and terminal 48, nine N turns. Inductance of inductor 54 is, for example, 1.6 henry and the values of the resistors and capacitors in FIGURE 4 are, for example, the same as in FIGURE 3. An error compensated signal $e(u)$ is generated across the capacitors 56 and 64. A conductor 110 connects the junction of capacitor 64 with resistors 66 to output terminal 26 to add the synthesized voltage vector $e(u)$ to the output vector $V_4$. The compensated output signal is substantially free of error phase displacements due to frequency variations of the excitation source and is available at a junction 112 of inductor 54 with capacitor 56 relative to ground potential 25.

The accuracy of the compensating network is now calculated.

The ideal compensating vector $\bar{e}(u)$ of FIGURE 1 as computed in Table 1 is based on the amplitude reference $V_1$ which is the radius of the circle diagram. The excitation V from source 40 in FIGURE 3 must be scaled to $V_1$. Taking the real components for $u=.95$ from Tables 1 and 3 sets the scale factor $$K = \frac{.0514}{.0712} = .72$$

and for $u = 1.05$, $$K = \frac{.0488}{.0612} = .8$$

Selecting $K = .75$ as a good compromise, the results of scaling are given in Table 5 for unit radius in FIGURE 2.

Table 5

| $u$ | Real $\bar{e}$ | | $\Delta 1$ | $j\bar{e}$ | | $\Delta 2$ |
| --- | --- | --- | --- | --- | --- | --- |
| | Ideal from Table 1 | Actual from Table 3 | | Ideal from Table 1 | Actual from Table 4 | |
| .950 | +.0514 | +.0534 | +.0020 | +.0014 | +.0098 | +.0084 |
| .975 | +.0254 | +.0259 | +.0005 | +.0005 | +.0022 | +.0017 |
| 1.000 | .0000 | .0000 | .0000 | .0000 | .0000 | .0000 |
| 1.025 | −.0244 | −.0240 | −.0004 | +.0005 | +.0019 | +.0014 |
| 1.050 | −.0488 | −.0459 | −.0029 | +.0014 | +.0080 | +.0066 |

The values of $\Delta 1$ are balanced between +.002 and −.0029, while the values of $\Delta 2$ represents overcompensation of all the $j$ components with a worst error of .0084. Since the conditions of FIGURE 2 still prevail, phase angle errors can only be caused by errors in the real component. The largest error is $$\Delta\phi = .0029 \text{ rad.} = .17°$$

Figure 5:
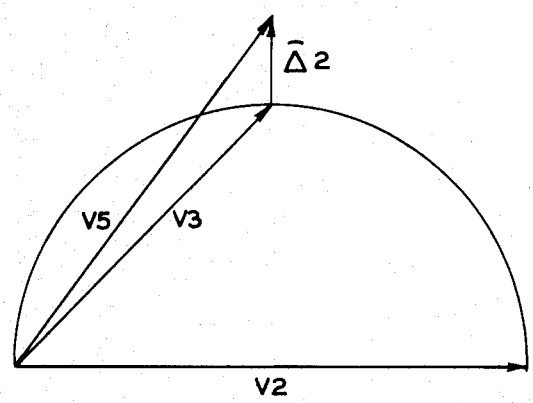
FIGURE 5 is a vector diagram showing the phase relationship between the voltages in the circuit of FIGURE 4.

For the phase clock input $\theta = 0°$ the circle diagram of FIGURE 2 may be redrawn, as shown in the FIGURE 5.

The amplitude of $\bar{V}_3$ remains invariant, hence all dimensions of FIGURE 5 are scaled down by the factor .707 of those in FIGURE 1. The component of the overcompensation $\Delta 2$ from Table 5 acting along the $j$ axis is also .707 $\Delta 2$. Neglecting the effects of $\Delta 1$ which are already quite small, the largest error due to $\Delta 2$ is $$\Delta\phi = .707^2 \times .0084 = .0042 \text{ rad.} = .24°$$

As $\theta$ increases $\Delta\phi$ gets smaller and disappears at $\theta = 45°$.

Thus there has been shown a circuit providing compensation of the frequency error in the phase clock which, in the example, has been effected by a passive network to reduce the error from 2.8° to .24°, an improvement in accuracy of one decade. Since the inherent error in a two pole resolver is in the order of .25°, a further improvement in the compensation will do little to improve the phase clock.

The basic phase clock shown in FIGURE 1 and in FIGURE 4 is of the resistive capacitive type. It should be noted that the circuit of the invention will perform equally satisfactorily with a resistive inductive type phase clock. The circuit of the invention is shown in FIGURES 1 and 4 with a resolver 10. The circuit of the invention will perform equally satisfactorily with synchros, resolvers, or tapped potentiometers, used with or without 3 or 4 two-wire converters. Such arrangements are shown in Sadvary, Pochtar, and Flaum, U.S. application Ser. No. 254,973, entitled Angular Displacement Phase Shift Encoder Analog to Digital Converter, assigned to the same assignee as the present application.

The operation of the invention is summarized briefly as follows. The uncompensated phase clock shown in FIGURE 1 receives a mechanical angular displacement through shaft 13 and provides across output terminal 26 a voltage $V_3$ whose phase angle is proportional to the mechanical angular displacement of shaft 13. As the frequency of source 14 varies for a predetermined center frequency, there is induced in the output signal $V_3$ a corresponding phase shift, independent of the shaft displacements. For example, at frequency greater than the center frequency, there is a phase shift in a first sense; and for a frequency deviation below the center frequency, there is a phase shift in the opposite or in a second sense. These frequency induced phase shifts may be erroneously interpreted as mechanical displacements of shaft 13. The compensation network in the frequency compensated phase clock shown in FIGURE 3, and connected into the phase clock as shown in FIGURE 4, provides a phase displacement substantially equal to, but of opposite sense to, the frequency induced phase displacement. Thus, for a frequency variation above the center frequency, the uncompensated phase clock produces a phase shift in a first sense while the compensation network provides a phase shift in the opposite sense; and when these two signals are summed together, there is no net frequency induced phase shift. Likewise, for a frequency deviation ranging below the center frequency, there is provided a phase shift by the phase clock in a second sense and by the compensating network a phase shift in the first sense; thus, for frequency variations less than the center frequency, there is provided again no net frequency induced phase distortion.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a phase clock of the kind having a series connected resistor and reactance adapted to receive two input signals of like frequency and phase and of relatively variable amplitudes to provide at a junction of the resistor and the reactance a single output signal having a phase displacement varying relative to the phase of the input signals in accordance with the relative amplitudes of the input signals, said output signal also containing an error phase displacement induced by frequency variations of the input signals from a predetermined center frequency, the improvement comprising a lumped, linear, passive, bilateral network interconnected with the phase shifter having an input connected across the resistor and reactance to receive the input signals and an output connected to the junction of the resistor and reactance to provide a frequency error compensation signal, which varies in amplitude in accordance with said frequency variations and is substantially opposite in phase to the error phase displacement of the output signal, and the output signal and the error compensation signal being summed at the output to provide a compensated output signal substantially free of error phase displacement due to frequency variations of the input signals from the center frequency.

2. The combination defined by claim 1 in which the network includes an isolation transformer having a primary winding connected to the opposite ends of the series connected resistors and reactances for receiving the two input signals and a secondary winding having two terminals; a null network having an input connected to the transformer secondary winding, and a two terminal output; said null network having a transfer function $$\frac{e(u)}{v} = \frac{(1-u^2)-ju}{(1-u^2)^2+u^2} - 3\frac{(1-u^2)-j3u}{(1-u^2)^2+9u^2}$$

where $u$ is the ratio of the input signal's frequency to the predetermined center frequency, $e(u)$ is the frequency error compensation signal, and $v$ is a voltage across the primary winding; conducting means connecting one terminal of the output of the null network to the junction of the resistor and the reactance of the phase shifter to provide at the other terminal of the network the compensated output signal.

3. The combination defined by claim 2 in which the secondary winding includes first and second terminals and a tap, and said null network includes a first resistor, an inductor, a first capacitor, a second capacitor, a second resistor and a third resistor connected in series between the two terminals of the secondary winding; conducting means connecting the junction of the first and second capacitors to the tap; a third capacitor connecting the junction of the second and third resistors to the tap, and an electrical output being provided across the first and second capacitors.

4. A combination comprising a source of excitation having a frequency range varying about a predetermined center frequency, a resolver having an analog input shaft and having input terminals coupled to said source, said resolver also including means for producing output signals having amplitudes proportional to sine and cosine of the angle of said analog input shaft; a phase shifting network comprising a resistance element and a reactance element connected to the sine and cosine output circuits of said resolver for producing an output voltage phase shifted with respect to said source in accordance with the ratio of the amplitudes of the output signals from the resolver, a lumped linear passive bilateral network connected to the phase shifting network for producing a frequency compensation error signal which varies in amplitude in accordance with frequency variations of the source from a predetermined center frequency, and reverses phase in accordance therewith, and means for combining the output voltage with the frequency compensation error signal to provide a compensated output voltage phase shifted with respect to the source in accordance with the ratio of the amplitude of the output signal from the resolver and which is substantially insensitive to frequency variations of the source.

5. The combination defined by claim 4 in which the network includes an isolation transformer having a primary connected to the opposite ends of the series connected resistors and capacitors to receive the two input signals, and a secondary winding having two terminals, a null network having an input connected to the transformer secondary winding and a two terminal output, said null network having a transfer function $$\frac{e(u)}{v} = \frac{(1-u^2)-ju}{(1-u^2)^2+u^2} - 3\frac{(1-u^2)-j3u}{(1-u^2)^2+9u^2}$$

where $u$ is the ratio of frequency of the excitation of the source to a predetermined center frequency, $e(u)$ is the frequency compensation error signal, $v$ is a voltage across the secondary winding, conducting means connecting one terminal of the output of the null network to the junction of the resistor and the capacitor of the phase shifter to provide at the other terminal of the network the compensated output signal.

6. A frequency compensated phase clock comprising a source of excitation referenced to ground potential, a resolver having at least one rotor winding connected to said source of excitation and adapted to be angularly displaced, a first and second stator winding displaced 90° from each other and connected at a common point to the ground potential and inductively coupled to said rotor winding providing thereon signals whose amplitudes vary in accordance with the sine and cosine of the angular displacement of the rotor, a resistive and a reactive element serially connected across the stator windings and providing at the junction of the two elements an output signal whose phase is displaced in accordance with the angular displacement of the rotor, said signal also containing an error phase displacement in accordance with frequency variations of the source from a predetermined center frequency, a coupling transformer having a primary winding connected across the stators and a secondary winding, a double damped network having an input connected to said secondary winding and a two terminal output having one terminal connected to the junction of the two elements providing at the other terminal relative to ground potential a compensated output signal whose phase angle is proportional to the angular displacement of the rotor and which is substantially insensitive to frequency variation of the source from the predetermined center frequency.

7. The combination defined by claim 6 in which the secondary winding includes a first winding and a second winding, the first winding having a ratio to the second winding of substantially three to eight, a first circuit including series resistive, inductive and capacitive elements across the first winding and a second circuit including series capacitive and resistive elements connected across the second winding, and a third circuit including series resistive and capacitive elements connected across said second circuit capacitive element, and an electrical output across the capacitive elements of the first and third circuits.

References Cited by the Examiner
UNITED STATES PATENTS

| | | | |
|---|---|---|---|
| 2,770,726 | 11/1956 | Fairweather | 323—123 |
| 2,880,391 | 3/1959 | Norton | 323—110 |

LLOYD McCOLLUM, *Primary Examiner.*